Nov. 12, 1929.    C. VAN RENNES    1,735,700
AIRBAG VALVE
Filed Dec. 10, 1927
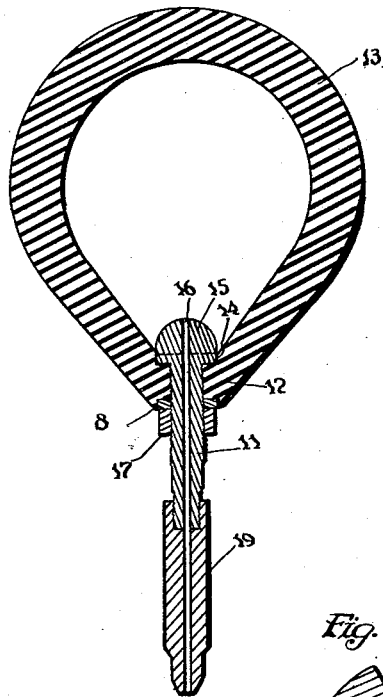
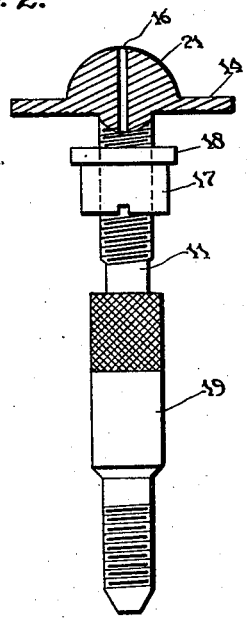
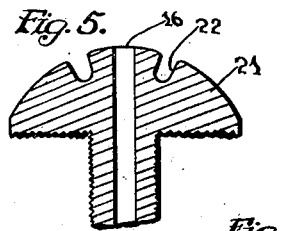
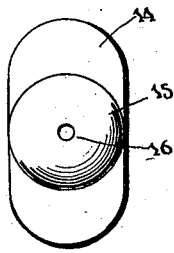
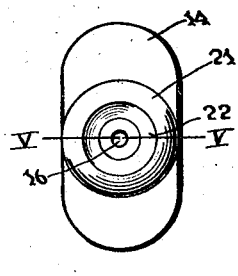
Inventor
Cornelis Van Rennes.

Patented Nov. 12, 1929

1,735,700

UNITED STATES PATENT OFFICE

CORNELIS VAN RENNES, OF AKRON, OHIO, ASSIGNOR TO THE GOODYEAR TIRE & RUBBER COMPANY, OF AKRON, OHIO, A CORPORATION OF OHIO

AIR-BAG VALVE

Application filed December 10, 1927. Serial No. 239,128.

This invention relates to airbags of the type utilized as cores for pneumatic tire casings during the vulcanizing operation and it has particular relation to valves for inflating and deflating such bags.

When the use of rubber airbags as cores for pneumatic tires was first proposed and practised, the heat of the vulcanizing operation overcured the material of the bags and caused cracking and breaking thereof after use in only one or two tires. This difficulty has now been overcome by the utilization of a liquid, such as glycerine, within the bag, which serves to maintain the interior surface of the bag coated and therefore prevents overcuring and oxidization of the inner portion of the bag material.

A single airbag may now be used to cure about fifty tires before the exterior surface of the bag becomes checked. The exterior of the bag is then ground off and a new cover is applied, after which the bag may be again utilized. The use of glycerine or a similar liquid in the cores is essential as it permits of the use of a single core for the curing of from one hundred to two hundred tires, whereas it was formerly possible to cure a comparatively few tires with a single bag.

Considerable difficulty has been experienced by reason of discharge of the glycerine from the valve of the core during manipulation thereof. Although only a small amount of the liquid, for example one-half pint to two quarts, is utilized in each core, a portion of the liquid often collects within the hollow of the valve and, when pressure is subsequently exerted upon the bag, the liquid is thrown out of the valve and falls upon the tire or tires to be vulcanized. Since the liquid is designed to retard vulcanization of the rubber with which it comes in contact, portions of the uncured tires upon which the glycerine falls cannot thereafter be properly vulcanized and blemishes on the finished product result.

The essential object of this invention is to provide a valve for an airbag designed to prevent flow of the glycerine into the valve so that it cannot be subsequently blown out upon the unvulcanized tire.

For a better understanding of the invention, reference may now be had to the accompanying drawings forming a part of the disclosure, in which;

Fig. 1 is a cross-sectional view of an airbag having a valve embodying the features of this invention operatively associated therewith;

Fig. 2 is a side-elevational view, partially in section, of a valve showing a modified embodiment of the invention;

Fig. 3 is a top plan view on a larger scale of the form of valve illustrated in Fig. 1;

Fig. 4 is a similar view of a valve having an additional feature that may be realized in the invention; and Fig. 5 is a fragmentary sectional view of a portion of the valve shown in Fig. 4, the section being taken substantially along line V—V of Fig. 4.

In the particular embodiment of the invention illustrated in Figure 1 of the accompanying drawings, a tube 11 traverses the wall 12 of an airbag 13 and is formed adjacent its inner end with an elongate flange 14 that is embedded in the wall 12 of the bag. A hemispherical projection 15, apertured, as indicated at 16, in alignment with the passage of the tube 11, extends from the flange 14 into the interior of the bag. A nut 17, threaded on the tube 11, engages a washer 18 which coacts with the flange 14 to maintain the tube in operative position with respect to the bag 13. Extensions 19 may be attached to the tube 11 to adapt it for use with different types of hose fittings.

The embodiment of the invention illustrated in Fig. 2 differs from that just described in that a projection 21 is utilized which is semi-ellipsoidal in form and consequently does not extend as far into the bag as does the projection 15.

A groove 22 may be provided in the projection 21, in concentric relation to the aperture 16 therein, to aid in preventing flow of the glycerine into the tube 11. It is to be understood that such groove may be employed in conjunction with the type of valve illustrated in Fig. 1, as well as with that illustrated in the other figure. In practice, however, the groove is not required when a hemispherical projection is utilized, unless an unusually large amount of liquid is to be contained within the bag.

From the foregoing description it will be apparent that the above mentioned difficulties have been overcome by the provision of an airbag having a valve formed with a curved projection extending into the interior of the bag.

Although I have illustrated only one form which the invention may assume and have described only a single application thereof, it will be apparent to those skilled in the art that it is not so limited, but that various minor modifications may be made therein without departing from the spirit of the invention or from the scope of the appended claims.

What I claim is:

1. An airbag comprising a hollow body and a tube extending through the wall of the body terminating in a hemispherical grooved end disposed within the body.

2. An airbag comprising a hollow annular body, a tube extending through the wall of the body, a flange on the tube, and a curved projection extending from the flange into the interior of the body and formed with a concentric groove.

3. An airbag comprising a hollow annular body, a tube extending through the wall of the body, a flange on the tube, and a hemispherical projection extending from the flange into the interior of the body and formed with a concentric groove.

4. An airbag valve comprising a tube, a flange on the tube, and a curved projection extending from the flange and formed with a concentric groove.

5. An airbag comprising a hollow annular body, a tube extending through the wall of the body, a projection extending from the inner end of the tube into the interior of the body and formed with a groove disposed about the opening in the tube.

6. An airbag comprising a hollow annular body, a tube extending through the wall of the body, a curved projection extending from the inner end of the tube into the interior of the body and formed with a groove disposed about the opening in the tube.

7. An airbag comprising a hollow annular body, a tube extending through the wall of the body, a hemispherical projection extending from the inner end of the tube into the interior of the body, and formed with a groove disposed about the opening in the tube.

8. An airbag comprising a hollow annular body, a tube extending through the wall of the body, a curved projection extending from the tube into the interior of the body and formed with a concentric groove.

In witness whereof, I have hereunto signed my name.

Signed at Akron, in the county of Summit, and State of Ohio, this 8th day of December, 1927.

CORNELIS VAN RENNES.